(12) United States Patent
Chen et al.

(10) Patent No.: US 12,394,210 B2
(45) Date of Patent: Aug. 19, 2025

(54) PROCESSING METHOD FOR VEHICLE SURROUND VIEW, VEHICLE SURROUND VIEW SYSTEM AND IN-VEHICLE PROCESSING DEVICE

(71) Applicant: LITE-ON TECHNOLOGY CORPORATION, Taipei (TW)

(72) Inventors: Yen-Chun Chen, Taipei (TW); Jiun-Shiung Chen, Taipei (TW); Chien-Chung Lee, Taipei (TW); Chi-Min Weng, Taipei (TW); Chuen-Ning Hsu, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 56 days.

(21) Appl. No.: 18/524,413

(22) Filed: Nov. 30, 2023

(65) Prior Publication Data
US 2024/0193958 A1    Jun. 13, 2024

Related U.S. Application Data

(60) Provisional application No. 63/431,338, filed on Dec. 9, 2022.

(30) Foreign Application Priority Data

Oct. 20, 2023   (CN) .......................... 202311364884.4

(51) Int. Cl.
*H04N 5/74* (2006.01)
*G06T 17/00* (2006.01)
(Continued)

(52) U.S. Cl.
CPC .............. *G06V 20/56* (2022.01); *G06T 17/00* (2013.01); *G06V 10/46* (2022.01); *H04N 5/74* (2013.01); *G06V 2201/07* (2022.01)

(58) Field of Classification Search
CPC . G06T 2207/30252; G06T 2207/30248; G06T 17/00; G06V 20/56; G06V 10/46; G06V 2201/07; H04N 5/74; H04N 9/31
(Continued)

(56) References Cited

U.S. PATENT DOCUMENTS 11,710,254 B2 *  7/2023  Shrivastava .............. G06T 7/74
                                                                382/103
2018/0089801 A1    3/2018  Nemeth et al.
2023/0316773 A1* 10/2023  Avadhanam ........... G06V 20/58
                                                                382/104

FOREIGN PATENT DOCUMENTS

EP           3039644 A1    7/2016

OTHER PUBLICATIONS

Search report issued by European Patent Office on Apr. 26, 2024.
(Continued)

*Primary Examiner* — Sherrie Hsia
(74) *Attorney, Agent, or Firm* — WPAT, PC

(57) ABSTRACT

A processing method for vehicle surround view, a vehicle surround view system and an in-vehicle processing device are provided. The processing method for vehicle surround view includes the following steps: obtaining a first exterior image and a second exterior image; recognizing a first interest object in the first exterior image and a second interest object in the second exterior image; fitting the first interest object to a first geometric contour and fitting the second interest object to a second geometric contour; applying the first geometric contour and the second geometric contour on a 3D model, to obtain a ground point, a first contour position and a second contour position; obtaining a merged contour position according to the ground point; and projecting the first interest object or the second interest object at the merged contour position on a vehicle surround image.

19 Claims, 14 Drawing Sheets

(51) Int. Cl.
  *G06V 10/46* (2022.01)
  *G06V 20/56* (2022.01)
(58) Field of Classification Search
  USPC .......................... 348/148, 143; 382/103, 104
  See application file for complete search history.

(56) References Cited

OTHER PUBLICATIONS

Zhe Zhang et al., Object-Aware Ghost Identification and Elimination for Dynamic Scene Mosaic_20210628, Apr. 2022, IEEE Transactions on Circuits and Systems for Video Technology.

* cited by examiner

PROCESSING METHOD FOR VEHICLE SURROUND VIEW, VEHICLE SURROUND VIEW SYSTEM AND IN-VEHICLE PROCESSING DEVICE

This application claims the benefit of U.S. Provisional application Ser. No. 63/431,338, filed Dec. 9, 2022 and China application Serial No. 202311364884.4, filed Oct. 20, 2023, the disclosure of which is incorporated by reference herein in its entirety.

TECHNICAL FIELD

The disclosure relates in general to a processing method for surround view, a surround view system and a processing device, and more particularly to a processing method for vehicle surround view, a vehicle surround view system and an in-vehicle processing device.

BACKGROUND

With the development of technology, many vehicles are equipped with vehicle surround view systems to obtain vehicle surround images around the vehicle for the safety of parking and driving. The vehicle surround image can be obtained by stitching multiple images taken by several cameras.

However, the vehicle surround image obtained by the current vehicle surround view system often has objects disappearing or multiple display ghosts. For example, an object may be disappeared from the vehicle surround image. Two afterimages of the same object may be appeared. These situations may cause trouble when parking, and may affect driving safety in serious cases. Therefore, researchers are working to improve the vehicle surround view system to provide a more superior vehicle surround image.

SUMMARY

The disclosure is directed to a processing method for vehicle surround view, a vehicle surround view system and an in-vehicle processing device. In the process of stitching multiple exterior images to generate a vehicle surround image, the position of foreground objects and the source of the image are adaptively considered, so that people (or objects) will not partially disappear and multiple display ghosts will not be generated.

According to one embodiment, a processing method for vehicle surround view is provided. The processing method for vehicle surround view includes the following steps: obtaining a first exterior image and a second exterior image, wherein a first field-of-view for the first exterior image is different from a second field-of-view for the second exterior image; recognizing a first interest object in the first exterior image and a second interest object in the second exterior image, which correspond to an identical physical object; fitting the first interest object to a first geometric contour and fitting the second interest object to a second geometric contour; applying the first geometric contour and the second geometric contour on a 3D model, to obtain a ground point of the first geometric contour and the second geometric contour, a first contour position of the first geometric contour and a second contour position of the second geometric contour; obtaining a merged contour position between the first contour position and the second contour position according to the ground point; and projecting the first interest object or the second interest object at the merged contour position on a vehicle surround image.

According to another embodiment, a vehicle surround view system is provided. The vehicle surround view system includes a first camera, a second camera and an in-vehicle processing device. The first camera is used for obtaining a first exterior image. The first camera has a first field-of-view. The second camera is used for obtaining a second exterior image. The second camera has a second field-of-view. The first field-of-view is different from the second field-of-view. The in-vehicle processing device includes an object cropping unit, a geometric profile fitting unit, an applying unit, a location analysis unit and an image projection unit. The object cropping unit is used for recognizing a first interest object in the first exterior image and a second interest object in the second exterior image, which correspond to an identical physical object. The geometric profile fitting unit is used for fitting the first interest object to a first geometric contour and for fitting the second interest object to a second geometric contour. The applying unit is used for applying the first geometric contour and the second geometric contour on a 3D model, to obtain a ground point of the first geometric contour and the second geometric contour, a first contour position of the first geometric contour and a second contour position of the second geometric contour. The location analysis unit is used for obtaining a merged contour position between the first contour position and the second contour position according to the ground point. The image projection unit is used for projecting the first interest object or the second interest object at the merged contour position on a vehicle surround image.

According to an alternative embodiment, an in-vehicle processing device is provided. The in-vehicle processing device includes an object cropping unit, a geometric profile fitting unit, an applying unit, a location analysis unit and an image projection unit. The object cropping unit is used for recognizing a first interest object in a first exterior image and a second interest object in a second exterior image. A first field-of-view for the first exterior image is different from a second field-of-view for the second exterior image. The first interest object and the second interest object correspond to an identical physical object. The geometric profile fitting unit is used for fitting the first interest object to a first geometric contour in the first exterior image and fitting the second interest object to a second geometric contour in the second exterior image. The applying unit is used for applying the first geometric contour and the second geometric contour on a 3D model, to obtain a ground point of the first geometric contour and the second geometric contour, a first contour position of the first geometric contour and a second contour position of the second geometric contour. The location analysis unit is used for obtaining a merged contour position between the first contour position and the second contour position according to the ground point. The image projection unit is used for projecting the first interest object or the second interest object at the merged contour position on a vehicle surround image.

Figure 1:
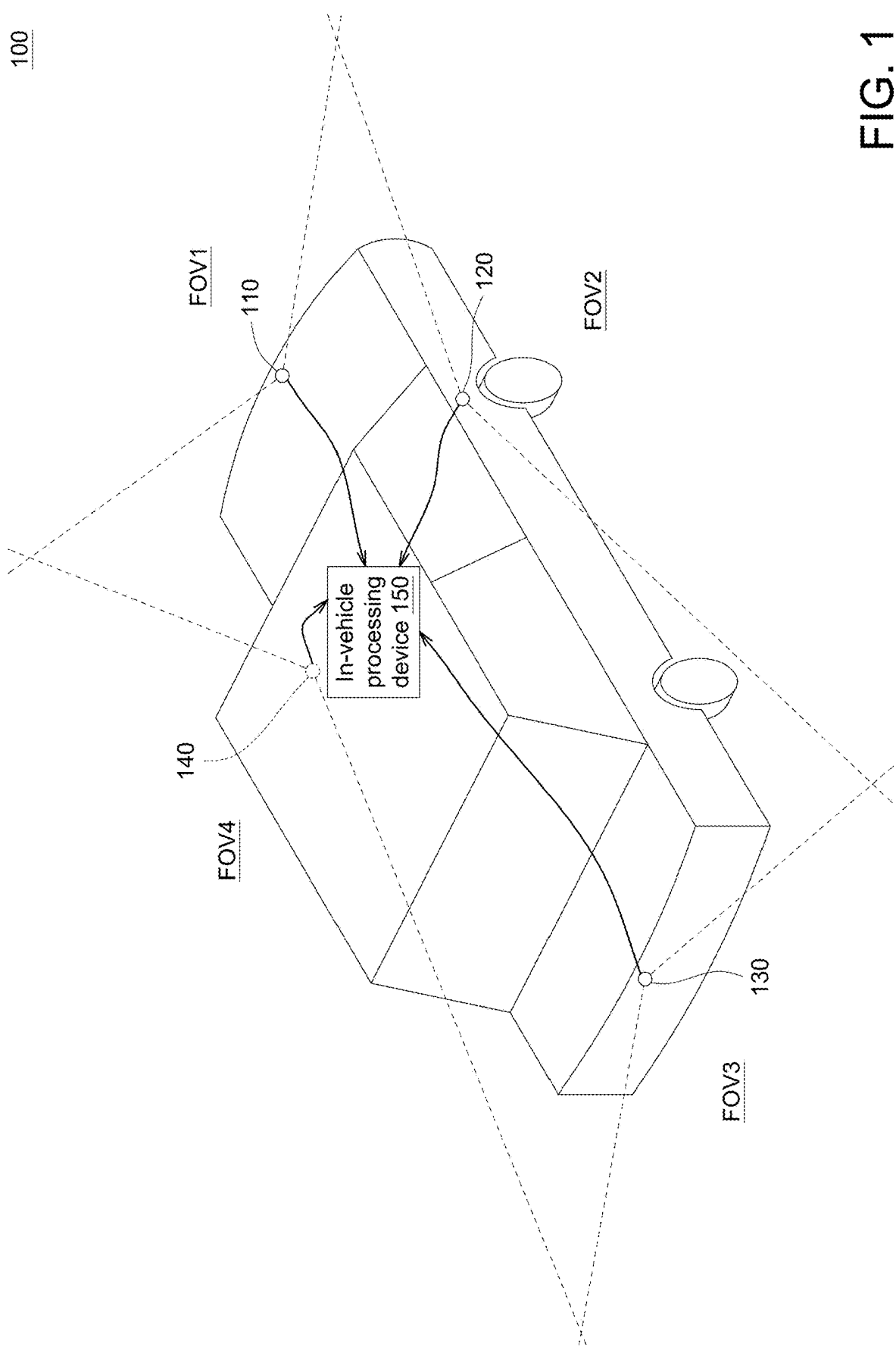
FIG. 1 illustrates a schematic diagram of a vehicle surround view system according to one embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Please refer to FIG. 1, which illustrates a schematic diagram of a vehicle surround view system 100 according to one embodiment. The vehicle surround view system 100 includes a first camera 110, a second camera 120, a third camera 130, a fourth camera 140 and an in-vehicle processing device 150. The number of cameras may be greater than or equal to two, which does not limit the scope of the present invention. The first camera 110, the second camera 120, the third camera 130 and the fourth camera 140 are, for example, fisheye cameras, wide-angle cameras or general cameras. The in-vehicle processing device 150 is, for example, a vehicle central processing device or a cloud computing center. A first field-of-view FOV1 of the first camera 110 and a second field-of-view FOV2 of the second camera 120 are partially overlapped. The second field-of-view FOV2 of the second camera 120 and a third imaging range FOV3 of the third camera 130 are partially overlapped. The third imaging range FOV3 of the third camera 130 and a fourth imaging range FOV4 of the fourth camera 140 are partially overlapped. The fourth imaging range FOV4 of the fourth camera 140 and the first field-of-view FOV1 of the first camera 110 are partially overlapped.

Figure 2:
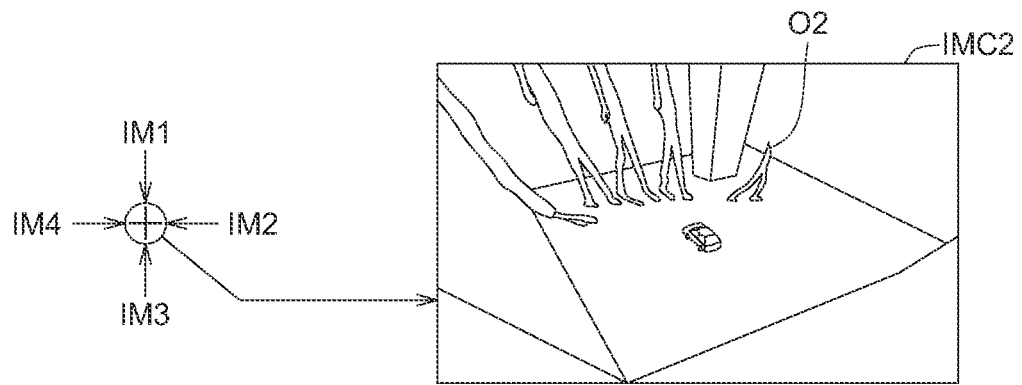
FIG. 2 shows a vehicle surround image according to one embodiment.

Please refer to FIG. 2, which shows a vehicle surround image IMC2 according to one embodiment. After stitching a first exterior image IM1 of the first camera 110, a second exterior image IM2 of the second camera 120, a third exterior image IM3 of the third camera 130 and a fourth exterior image IM4 of the fourth camera 140, a vehicle surround image IMC2 could be obtained. In one case, due to the different positions of each camera, the people O2 (or objects) on the vehicle surround image IMC2 may partially or completely disappear during the stitching process.

Figure 3:
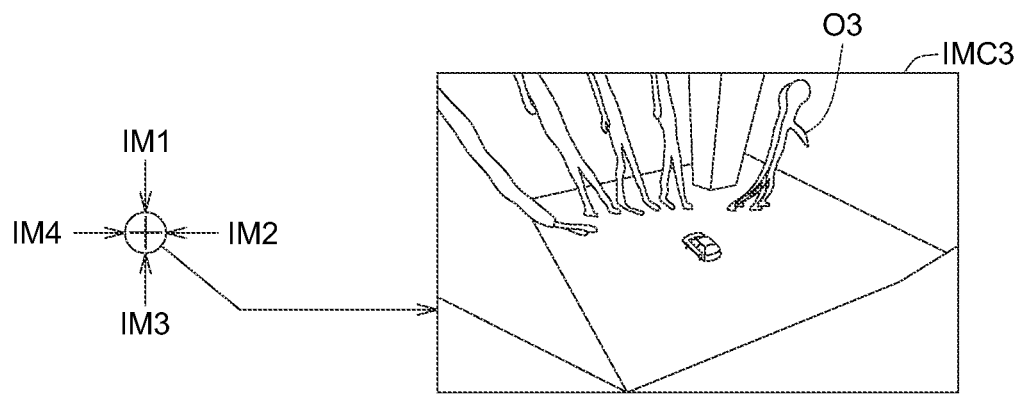
FIG. 3 shows a vehicle surround image according to one embodiment.

Please refer to FIG. 3, which shows a vehicle surround image IMC3 according to one embodiment. After stitching the first exterior image IM1 of the first camera 110, the second exterior image IM2 of the second camera 120, the third exterior image IM3 of the third camera 130 and the fourth exterior image IM4 of the fourth camera 140, a vehicle surround image IMC3 could be obtained. In one case, due to the different positions of each camera, the people O3 (or objects) on the vehicle surround image IMC3 may produce multiple display ghosts during the stitching process.

Figure 4:
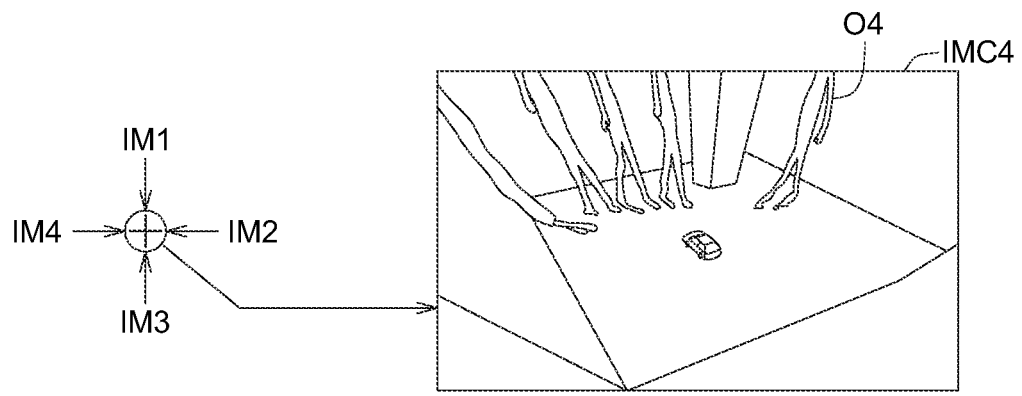
FIG. 4 shows a vehicle surround image according to one embodiment.

Please refer to FIG. 4, which shows a vehicle surround image IMC4 according to one embodiment. After stitching the first exterior image IM1 of the first camera 110, the second exterior image IM2 of the second camera 120, the third exterior image IM3 of the third camera 130 and the fourth exterior image IM4 of the fourth camera 140, a vehicle surround image IMC4 could be obtained. In this embodiment, even if the positions of the cameras are different, the position of the foreground object and the imaging sources can be adaptively considered during the stitching process, so that the people O4 (or objects) on the vehicle surround image IMC4 will not be partially disappeared and multiple display ghosts will not be generated. The processing method of this embodiment will be further described below.

Figure 5:
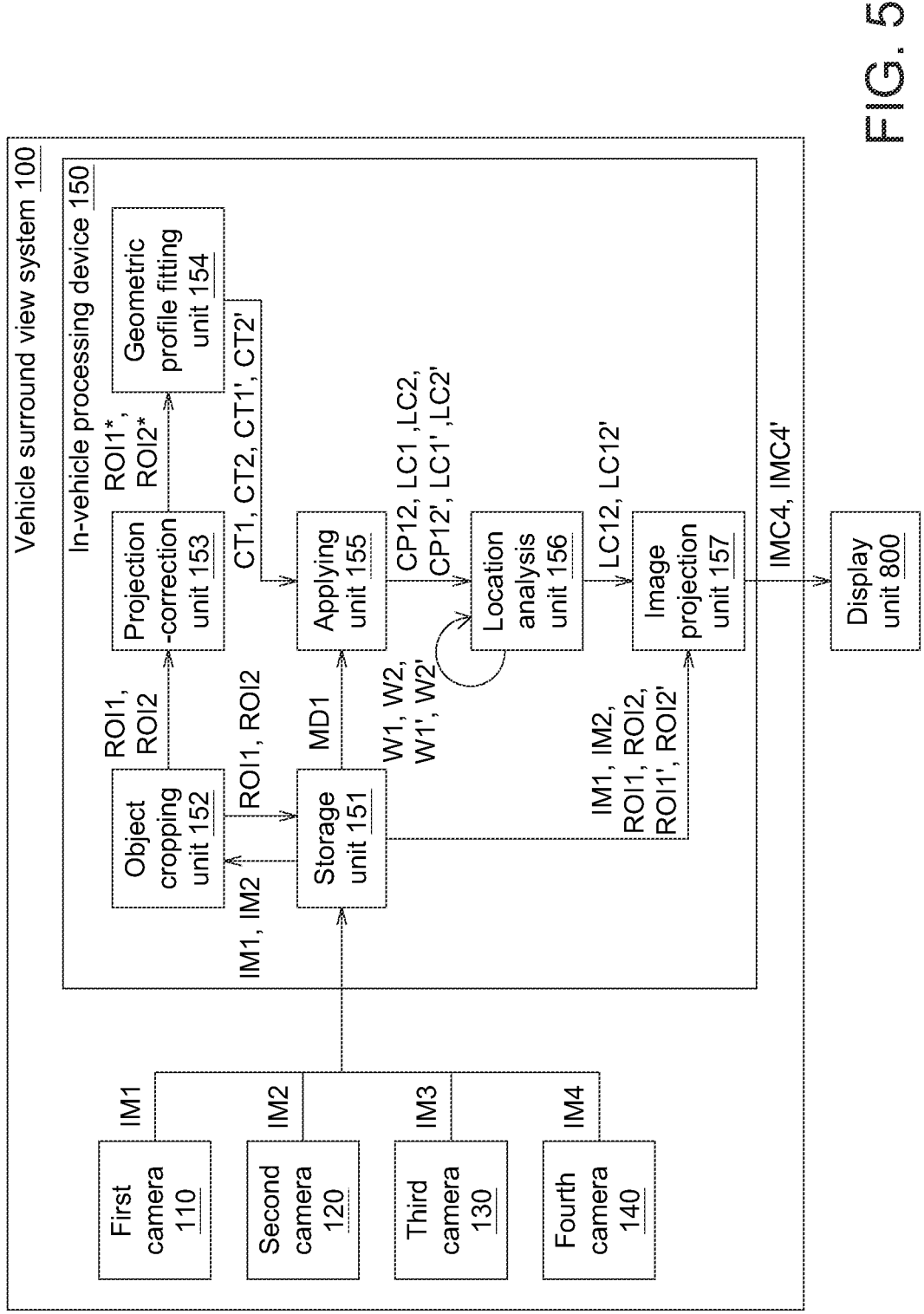
FIG. 5 illustrates a block diagram of a vehicle surround view system according to one embodiment.

Please refer to FIG. 5, which illustrates a block diagram of the vehicle surround view system 100 according to one embodiment. The vehicle surround view system 100 includes the first camera 110, the second camera 120, the third camera 130, the fourth camera 140 and the in-vehicle processing device 150. The in-vehicle processing device 150 includes a storage unit 151, an object cropping unit 152, a projection-correction unit 153, a geometric profile fitting unit 154, an applying unit 155, a location analysis unit 156 and an image projection unit 157. The object cropping unit 152, the projection-correction unit 153, the geometric profile fitting unit 154, the applying unit 155, the location analysis unit 156 and/or the image projection unit 157 are used to perform various analysis and processing procedures, such as a circuit, a circuit board, a chip (for example, a central processing unit, a graphics processor, or a digital signal processor) or a storage device that stores program codes. The storage unit 151 is used to store data, such as a memory, a hard disk or a cloud storage center. The display unit 800 is used to display various images and information, such as a liquid crystal display panel, a window projector or an OLED display panel. In this embodiment, during the process of stitching the first exterior image IM1, the second exterior image IM2, the third exterior image IM3 and the fourth exterior image IM4, the position of the foreground object and the imaging sources are adaptively considered to successfully obtain the vehicle surround image IMC4 shown in the FIG. 4. The following is a flow chart that explains in detail how each component operates.

Figure 6:
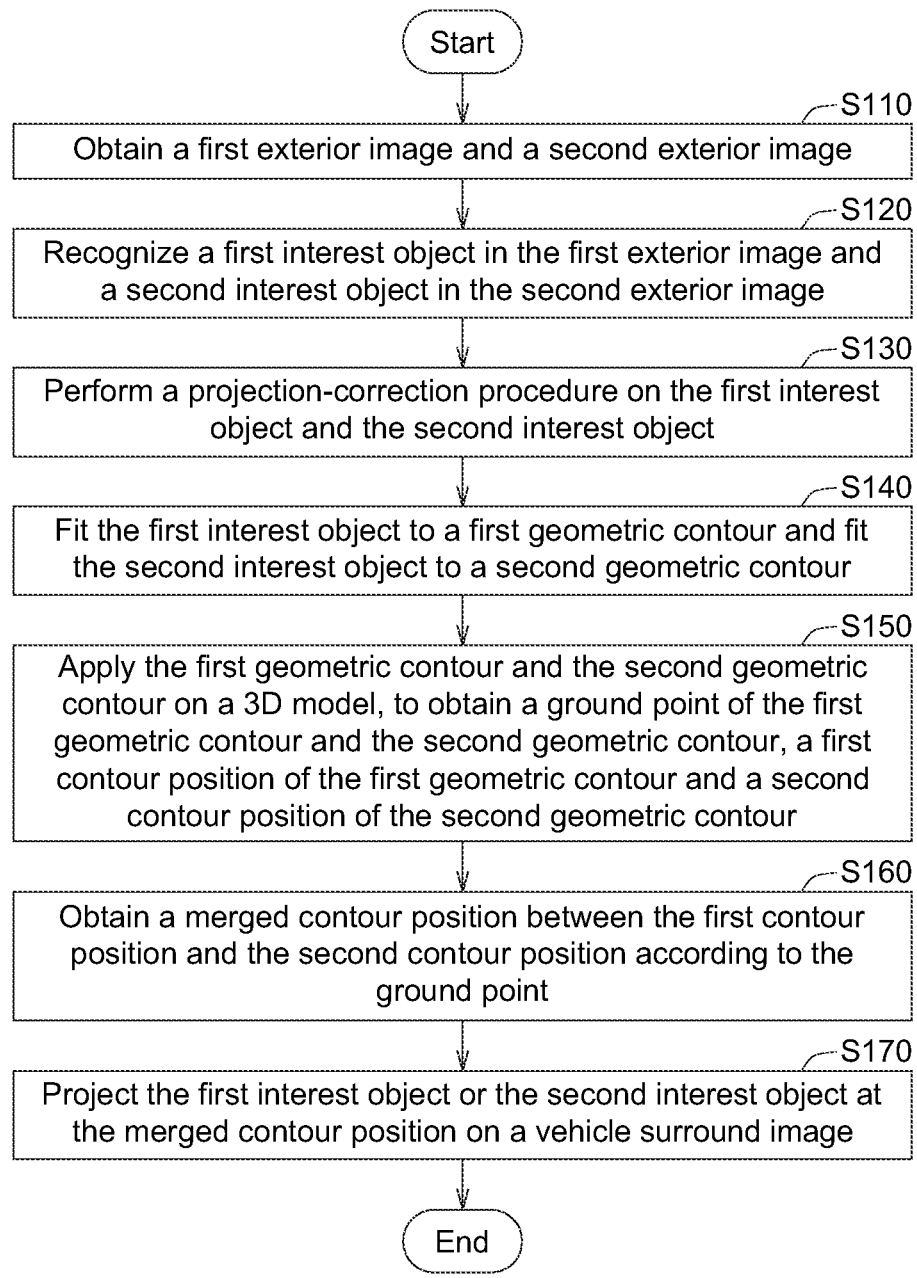
FIG. 6 illustrates a flow chart of a vehicle surround image processing method according to one embodiment.

Please refer to FIG. 5 and FIG. 6. FIG. 6 illustrates a flow chart of a vehicle surround image processing method according to one embodiment. The following processing method takes the first exterior image IM1 and the second exterior image IM2 as examples for illustration, but are not intended to limit the present disclosure. Any two partially overlapping exterior images, such as the second exterior image IM2 and the third exterior image IM3, the third exterior image IM3 and the fourth exterior image IM4, the fourth exterior image IM4 and the first exterior image IM1 are applicable to the processing method disclosed in this disclosure.

Figure 7:
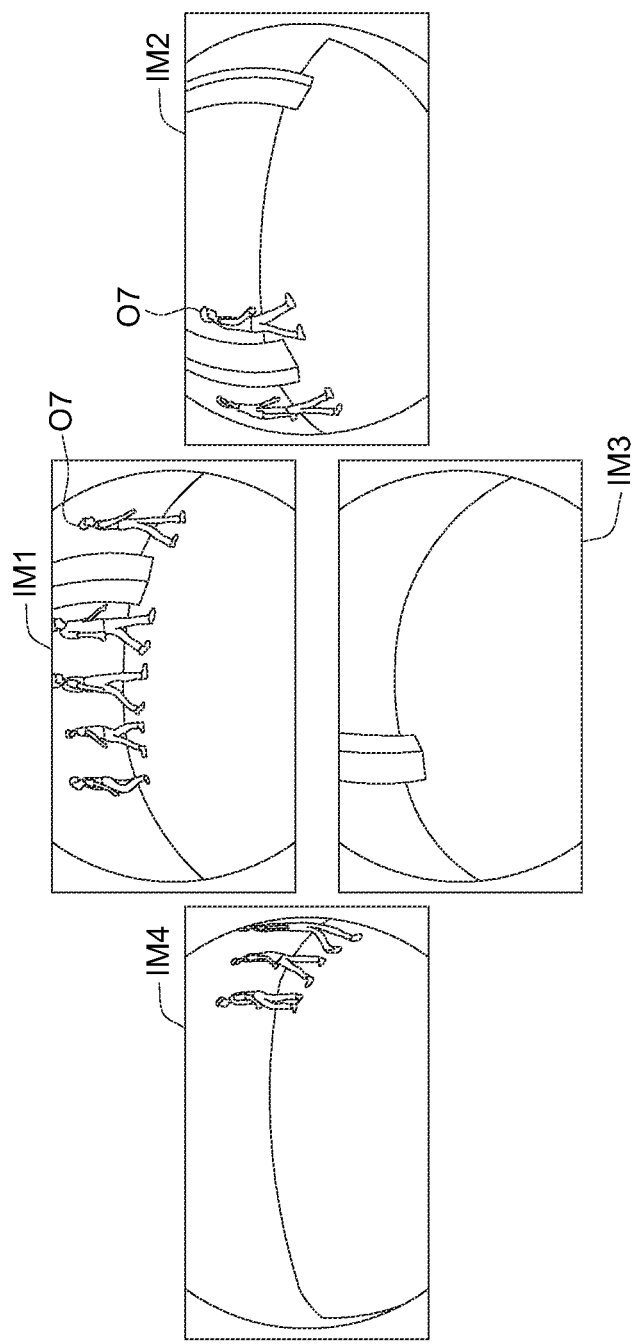
FIG. 7 illustrates a first exterior image, a second exterior image, a third exterior image and a fourth exterior image.

In step S110, as shown in FIG. 7, the first exterior image IM1 and the second exterior image IM2 are obtained from the first camera 110 and the second camera 120. The first exterior image IM1 and the second exterior image IM2 are temporarily stored in the storage unit 151, for example. FIG. 7 illustrates the first exterior image IM1, the second exterior image IM2, the third exterior image IM3 and the fourth exterior image IM4. As shown in the first exterior image IM1 and the second exterior image IM2 in FIG. 7, both the first exterior image IM1 and the second exterior image IM2 exist because of the same physical object O7.

Figure 8:
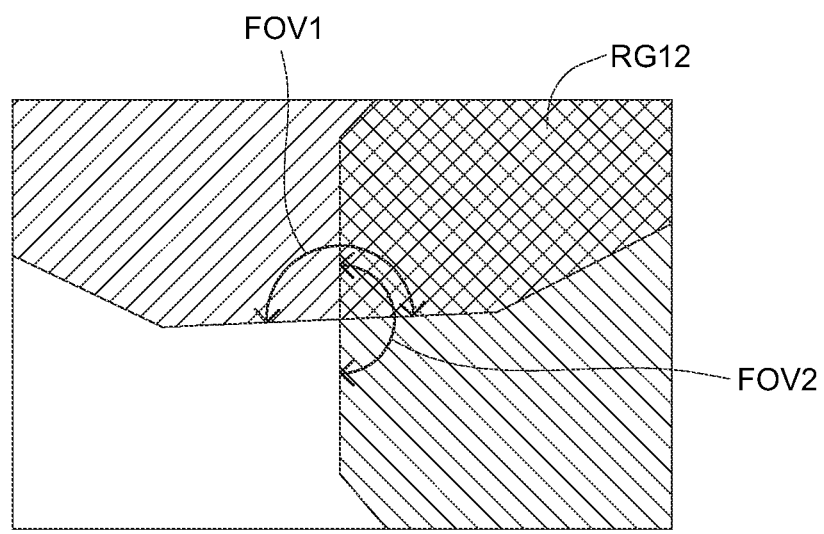
FIG. 8 illustrates the first field-of-view for the first exterior image and the second field-of-view for the second exterior image.

Please refer to FIG. 8, which illustrates the first field-of-view FOV1 for the first exterior image IM1 and the second field-of-view FOV2 for the second exterior image IM2. The first field-of-view FOV1 for the first exterior image IM1 is different from the second field-of-view FOV2 for the second exterior image IM2. The first field-of-view FOV1 and the second field-of-view FOV2 are partially overlapped. The physical object O7 is located in an overlapping area RG12 between the first field-of-view FOV1 and the second field-of-view FOV2. It is necessary to adaptively consider how to project the physical object O7 in this overlapping area RG12 to avoid partial disappearance or multiple display ghosts.

Figure 9:
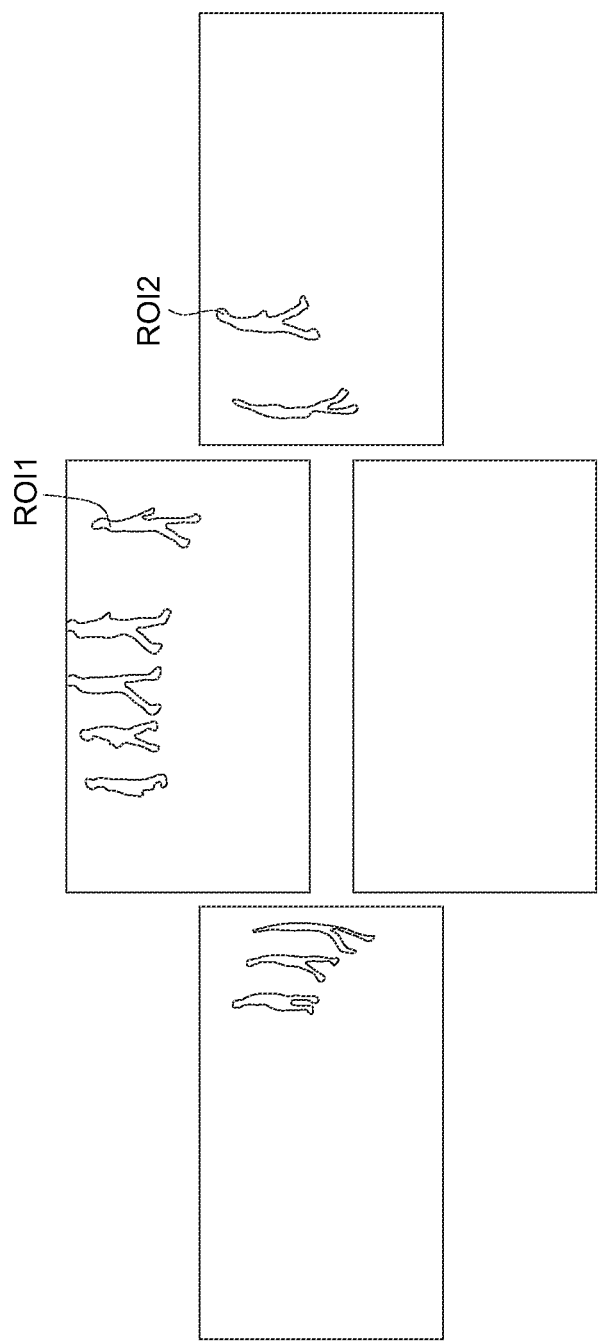
FIG. 9 shows a first interest object and a second interest object.

Then, in step S120, as shown in FIG. 9, the object cropping unit 152 recognizes a first interest object ROI1 and a second interest object ROI2 in the second exterior image IM1 and second exterior image IM2 respectively. The first interest object ROI1 and the second interest object ROI2 correspond to the identical physical object O7 (shown in FIG. 7). FIG. 9 shows the first interest object ROI1 and the second interest object ROI2. In this step, the object cropping unit 152 obtains the first interest object ROI1 and the second interest object ROI2 through artificial intelligence models, such as Region Convolutional Neural Network (R-CNN). The first interest object ROI1 and the second interest object ROI2 are, for example, people, objects, animals, obstacles, fixed structures, automobiles, motorcycles and other means of transportation.

Figure 10:
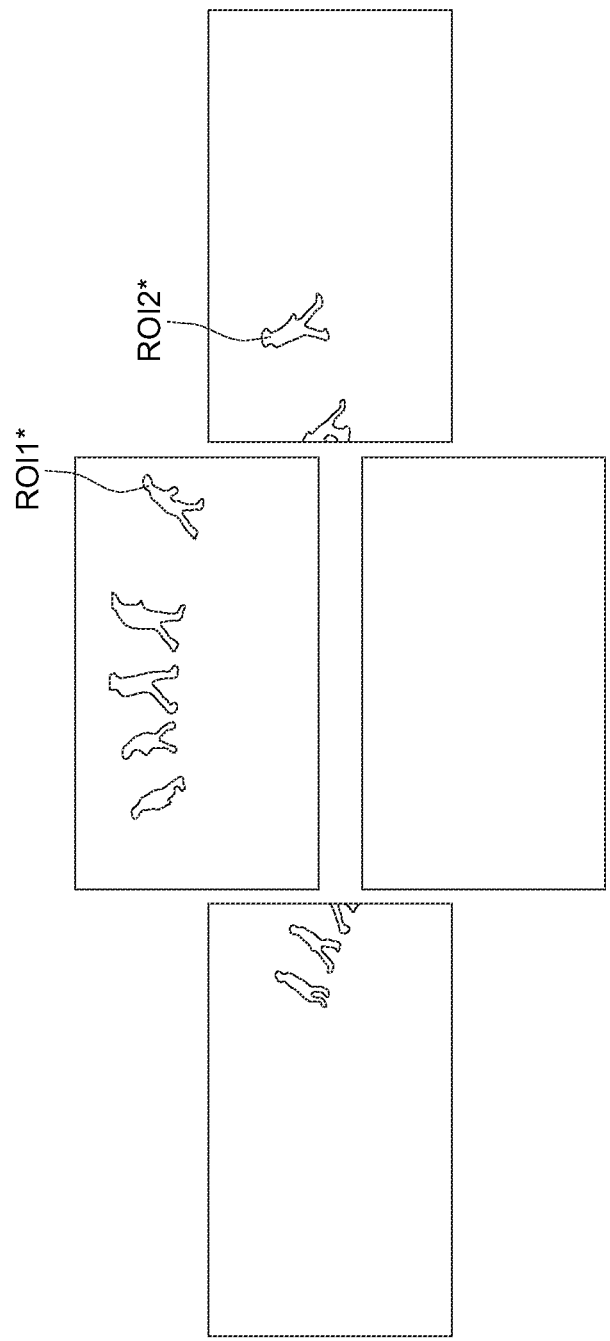
FIG. 10 shows the first interest object and the second interest object after projection-correction procedure.

Then, in step S130, as shown in FIG. 10, the projection-correction unit 153 performs a projection-correction procedure on the first interest object ROI1 and the second interest object ROI2. FIG. 10 shows a first interest object ROI1* and a second interest object ROI2* after projection-correction procedure. The projection-correction procedure is used to reduce the distortion caused by fisheye lenses or wide-angle lenses. For example, the projection-correction procedure is performed using a cylindrical projection procedure. In one embodiment, if the degree of deformation is not serious, this step can be omitted.

Figure 11:
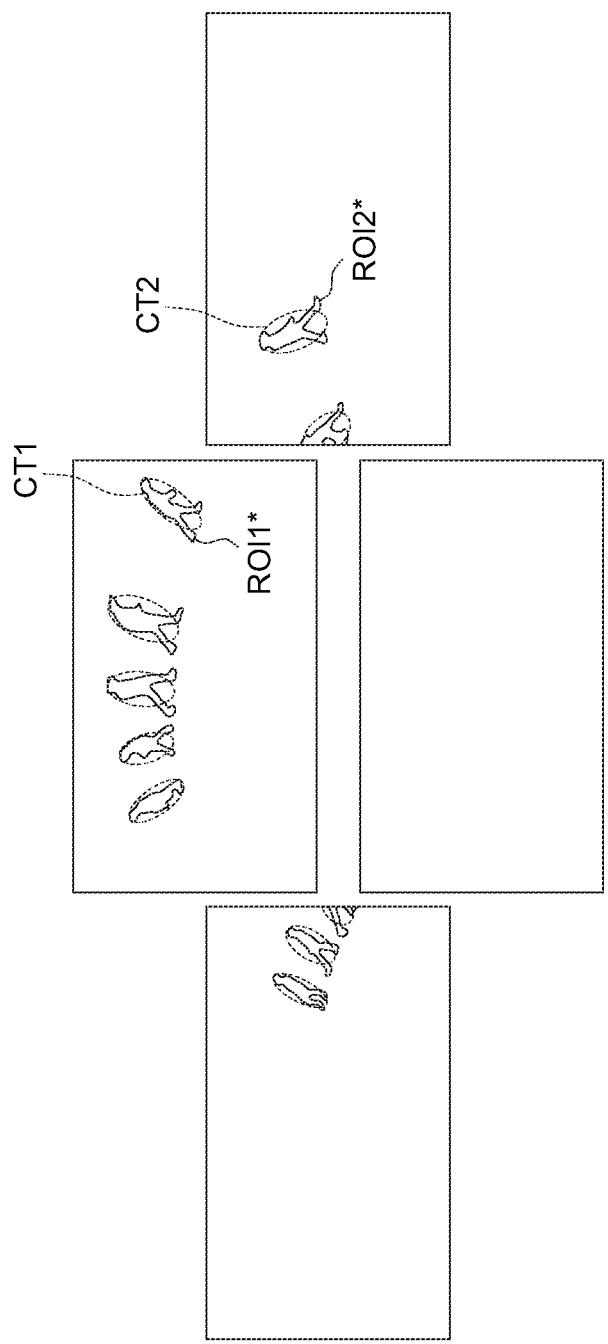
FIG. 11 shows a first geometric contour and a second geometric contour.

Next, in step S140, as shown in FIG. 11, the geometric profile fitting unit 154 fits the first interest object ROI1* (or the first interest object ROI1) to a first geometric contour CT1 and fits the second interest object ROI2* (or the second interest object ROI2) to a second geometric contour CT2. FIG. 11 shows the first geometric contour CT1 and the second geometric contour CT2. In this step, the geometric profile fitting unit 154 uses, for example, ellipses, circles, rectangles, squares, parallelograms, rhombuses or object outlines to be the first geometric contour CT1 and the second geometric contour CT2. The sizes of the first geometric contour CT1 and the second geometric contour CT2 could be different.

Figure 12:
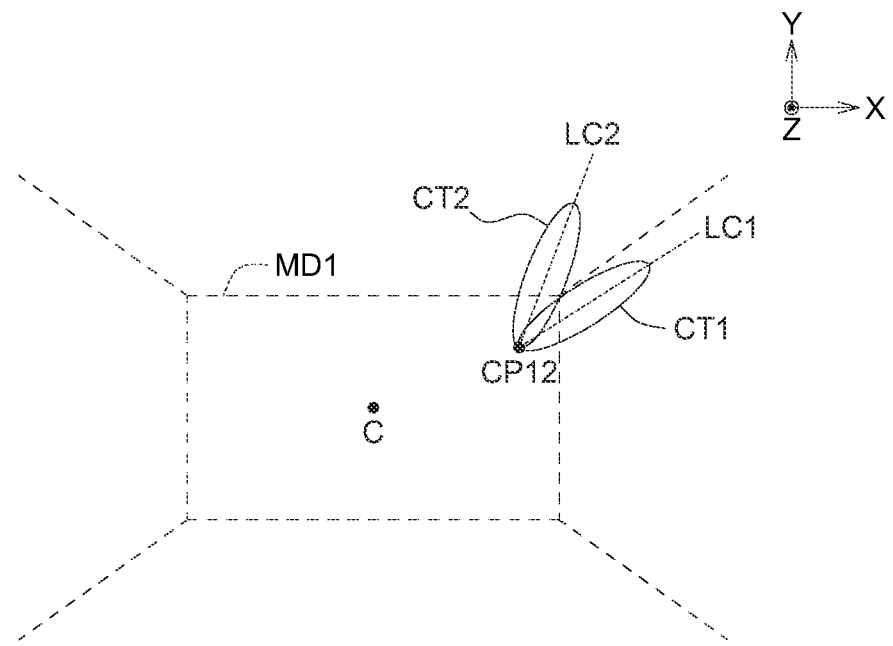
FIG. 12 shows a 3D model.

Then, in step S150, as shown in FIG. 12, the applying unit 155 applies the first geometric contour CT1 and the second geometric contour CT2 on a 3D model MD1 to obtain a ground point CP12 of the first geometric contour CT1 and the second geometric contour CT2, a first contour position LC1 of the first geometric contour CT1, and a second contour position LC2 of the second geometric contour CT2. FIG. 12 shows the 3D model MD1. For example, the first exterior image IM1, the second exterior image IM2, the third exterior image IM3, the fourth exterior image IM4 are back-projected on the 3D model MD1 through the respective intrinsic parameters and extrinsic parameters of the four cameras. On the 3D model MD1, the interest objects and the background will be back-projected on the 3D model MD1, and subsequent processing can be performed on the interest objects, such as the first interest object ROI1*, and the second interest object ROI2*.

For example, the ground point CP12 is the closest point between the first geometric contour CT1 and the second geometric contour CT2 to a center C of the 3D model MD1. The axis connecting the ground point CP12 to the corresponding point on the opposite side of the first geometric contour CT1 could be used as the first contour position LC1 of the first geometric contour CT1. The axis connecting the ground point CP12 to the corresponding point on the opposite side of the second geometric contour CT2 could be used as the second contour position LC2 of the second geometric contour CT2. In the example in FIG. 12, the ground point CP12 is located on the bottom plane of the 3D model MD1 (that is, the XY plane, Z axis is 0), the first contour position LC1 and the second contour position LC2 could be used to represent the rotation angle of the first geometric contour CT1 and the second geometric contour CT2. The difference between the first geometric contour CT1 and the second geometric contour CT2 is the difference in angle.

Figure 13:
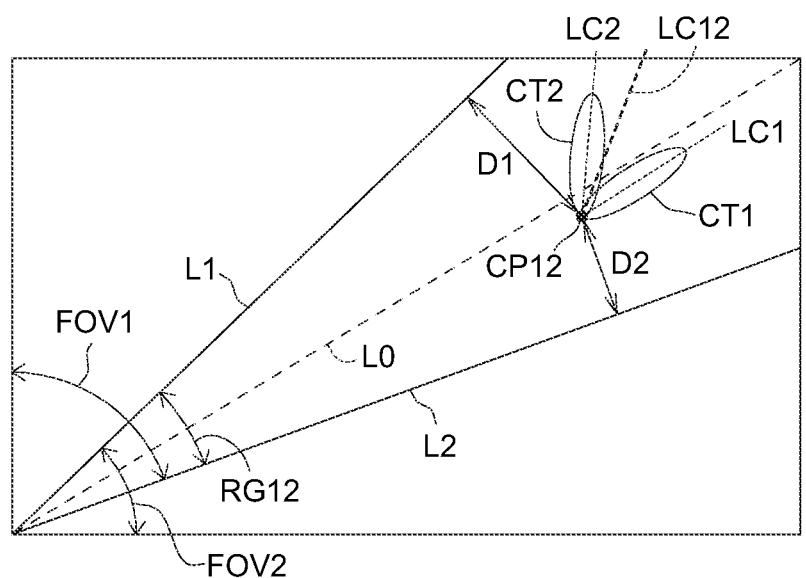
FIG. 13 illustrates a merged contour position.

Then, in step S160, as shown in FIG. 13, the location analysis unit 156 obtains a merged contour position LC12 between the first contour position LC1 and the second contour position LC2 according to the position of the ground point CP12. The merged contour position LC12 is obtained based on the position of the ground point CP12. Since the first geometric contour CT1 and the second geometric contour CT2 have the difference in angle, the merged contour position LC12 is determined based on the angle difference between the ground point CP12 to the first geometric contour CT1 and the second geometric contour CT2. FIG. 13 illustrates the merged contour position LC12. The first field-of-view FOV1 and the second field-of-view FOV2 have the overlapping area RG12. The overlapping area RG12 has a central line L0, a first end L1 and a second end L2. The first end L1 is the boundary of the second field-of-view FOV2, and the second end L2 is the boundary of the first field-of-view FOV1.

The location analysis unit 156 analyzes a first weighting W1 (shown in FIG. 5) and a second weighting W2 (shown in FIG. 5). The first weighting W1 and the second weighting W2 are related to the position of the ground point CP12 in the overlapping area RG12. The first weighting W1 is proportional to the extent that the ground point CP12 is close to first end L1 (for example, as shown in FIG. 13, it is the reciprocal of the distance D1). The second weighting W2 is proportional to the extent that the ground point CP12 is close to the second end L2 (for example, as shown in FIG. 13, it is the reciprocal of the distance D2).

The location analysis unit 156 performs weighted calculations on the first contour position LC1 and the second contour position LC2 using the first weighting W1 and the second weighting W2 respectively to obtain the merged contour position LC12.

Taking FIG. 13 as an example, if the ground point CP12 is close to the second end L2, the second weighting W2 is larger; at this time, the ground point CP12 is far away from the first end L1, so the first weighting W1 is small. After the weighted calculation of the first contour position LC1 and the second contour position LC2, the merged contour position LC12 will be more biased towards the second contour position LC2. The weighted calculation performed by the location analysis unit 156 is, for example, calculating the angle at the first contour position LC1 and the angle at the second contour position LC2 to calculate the angle at the merged contour position LC12. That is, the rotation angle between the merged contour position LC12 and the second contour position LC2 is smaller than the rotation angle between the merged contour position LC12 and the first contour position LC1.

Figure 14:
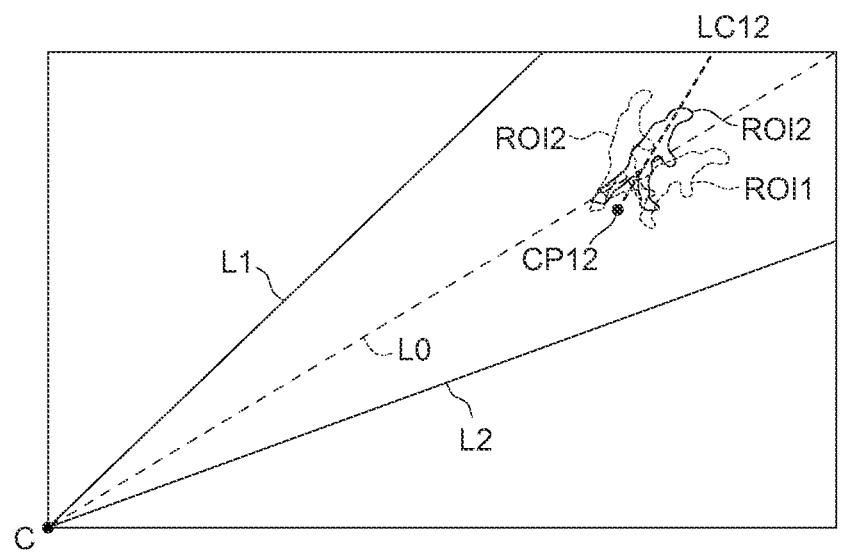
FIG. 14 illustrates an example of projecting the second interest object on a vehicle surround image according to the merged contour position.

Next, in step S170, as shown in FIG. 14, the image projection unit 157 projects the first interest object ROI1 or the second interest object ROI2 on the vehicle surround image IMC4 according to the merged contour position LC12. FIG. 14 illustrates the example of projecting the second interest object ROI2 on the vehicle surround image IMC4 (shown in FIG. 5) according to the merged contour position LC12. In this step, if the ground point CP12 is located between the first end L1 and the central line L0, the image projection unit 157, for example, projects the first interest object ROI1 on the vehicle surround image IMC4. That is to say, the first interest object ROI1 is used in the vehicle surround image IMC4. If the ground point CP12 is located between the central line L0 and the second end L2, the image projection unit 157, for example, projects the second interest object ROI2 on the vehicle surround image IMC4. That is to say, the second interest object ROI2 is used in the vehicle surround image IMC4.

As shown in FIG. 14, the ground point CP12 is located between the central line L0 and the second end L2, so the image projection unit 157 projects the second interest object ROI2 on the vehicle surround image IMC4. That is to say, the image projection unit 157 will completely use the second interest object ROI2 (or the first interest object ROI1) when performing projecting, so that in the vehicle surround image IMC4, a complete shape will be shown without partial disappearance or multiple ghost images.

Figure 15:
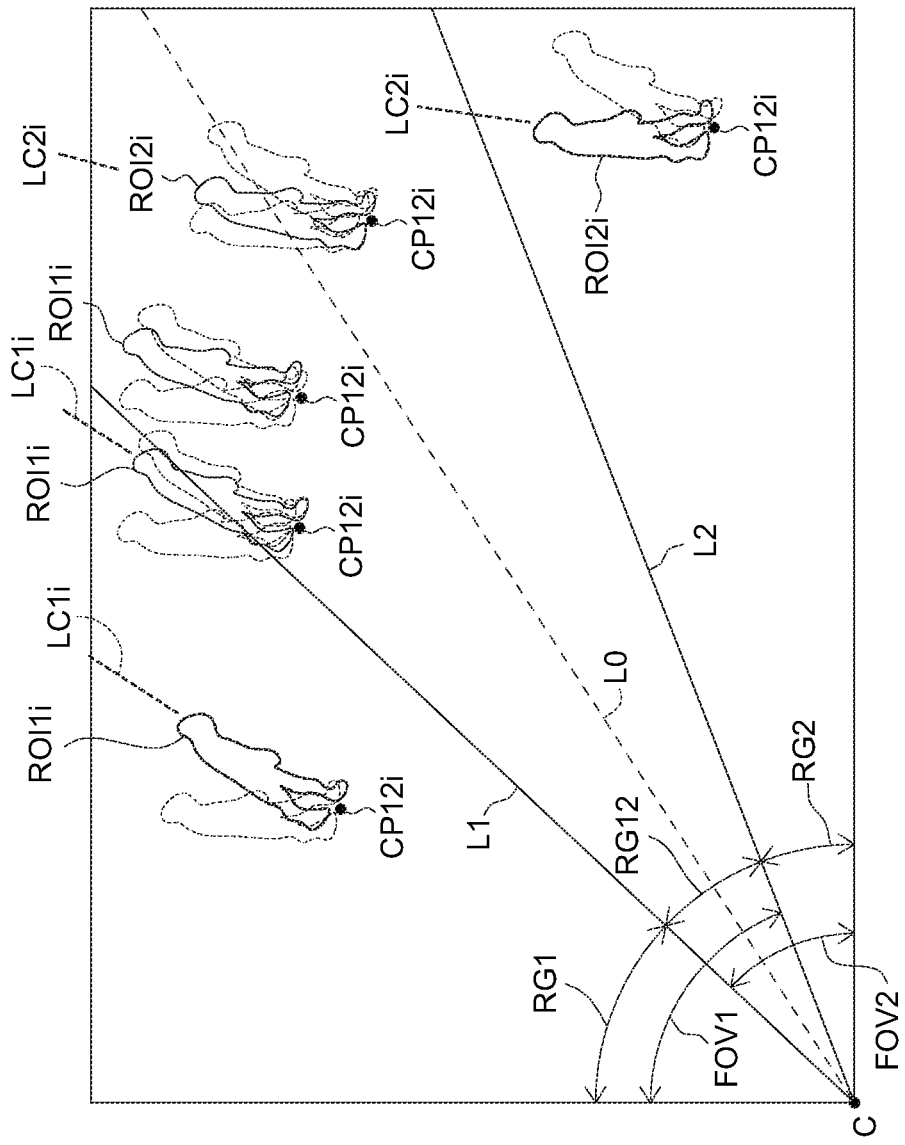
FIG. 15 illustrates the conditions corresponding to different ground points.

Please refer to FIG. 15, which illustrates the conditions corresponding to different ground points CP12$i$. The part of the first field-of-view FOV1 that does not overlap with the second field-of-view FOV2 is a first area RG1, and the part of the second field-of-view FOV2 that does not overlap with the first field-of-view FOV1 is a second area RG2. If the ground point CP12$i$ is located at the first area RG1, the image projection unit 157 will use the first interest object ROI1$i$ at first contour position LC1$i$ for projecting. If the ground point CP12$i$ is located in the overlapping area RG12, but closer to the first end L1, the image projection unit 157 will use the first interest object ROI1$i$ at the merged contour position LC12$i$ for projecting. If the ground point CP12$i$ is located in the overlapping area RG12 and is located on the central line L0, the image projection unit 157 will use the first interest object ROI1$i$ (or the second interest object ROI2$i$) at the merged contour position LC12$i$ for projecting. If the ground point CP12$i$ is located in the overlapping area RG12, but closer to the second end L2, the image projection unit 157 will use the second interest object ROI2$i$ at the second contour position LC2$i$ for projecting. If the ground point CP12$i$ is located at the second area RG2, the image projection unit 157 will use the second interest object ROI2$i$ at the second contour position LC2$i$ for projecting.

According to the above embodiment, during the process of stitching the first exterior image IM1, the second exterior image IM2, the third exterior image IM3 and the fourth exterior image IM4, the angle and imaging sources of the foreground object can be adaptively considered to successfully obtain the vehicle surround image IMC4 without people O4 (or objects) partially disappearing and without multiple ghosts.

Figure 16:
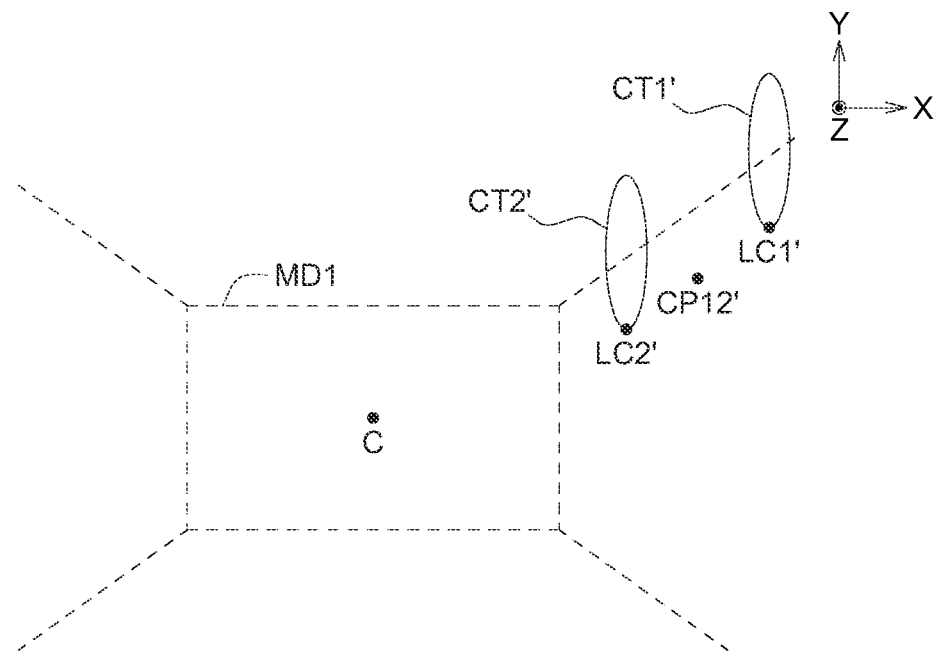
FIG. 16 illustrates the 3D model.

Please refer to FIG. 16, which illustrates the 3D model MD1. When the ground point CP12' is located on the side surface of the 3D model MD1 (that is, the raised projection surface on the 3D model MD1 whose Z axis is not equal to zero), the first contour position LC1' and the second contour position LC2' could be used to represent the translation positions of the first geometric contour CT1' and the second geometric contour CT2', the difference between the first geometric contour CT1' and the second geometric contour CT2' is the difference in the translation positions. The ground point CP12' is, for example, the middle point between the first contour position LC1' of the first geometric contour CT1' and the second contour position LC2' of the second geometric contour CT2'.

The following takes the case where the ground point CP12' is located on the side surface of the 3D model MD1 as an example to illustrate the above steps S150 to S170.

In step S150, as shown in FIG. 16, the applying unit 155 applies the first geometric contour CT1' and the second geometric contour CT2' on the 3D model MD1 to obtain the ground point CP12' of the first geometric contour CT1' and the second geometric contour CT2', the first contour position LC1' of the first geometric contour CT1', and the second contour position LC2' of the second geometric contour CT2'.

Figure 17:
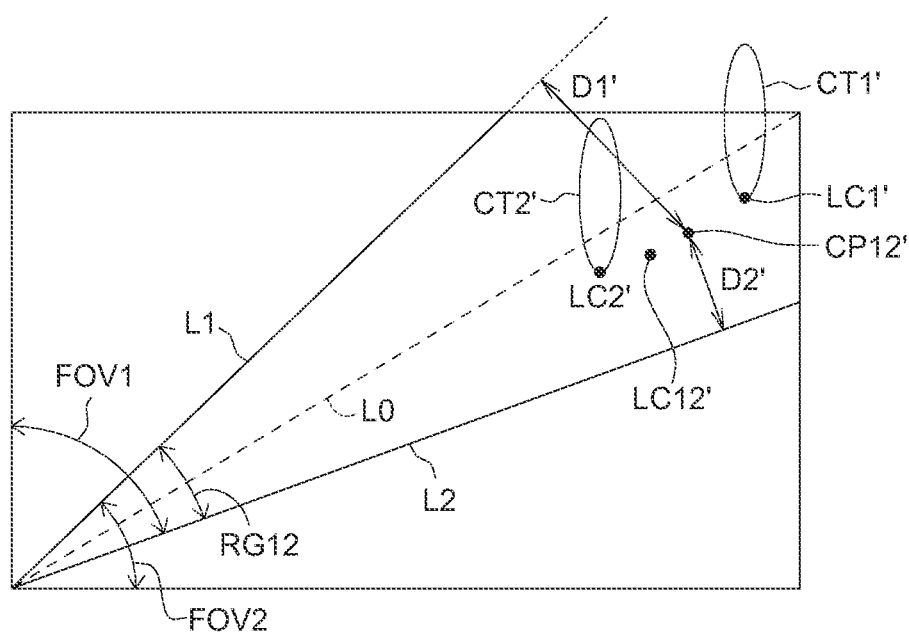
FIG. 17 shows the merged contour position.

Then, in step S160, as shown in FIG. 17, the location analysis unit 156 obtains a merged contour position LC12' between the first contour position LC1' and the second contour position LC2' according to the position of the ground point CP12'. FIG. 17 shows the merged contour position LC12'.

The location analysis unit 156 analyzes the first weighting W1' (shown in FIG. 5) and the second weighting W2' (shown in FIG. 5). The first weighting W1' and the second weighting W2' are related to the position of the ground point CP12' in the overlapping area RG12. The first weighting W1' is proportional to an extent that the ground point CP12' is close to the first end L1 (for example, it is the reciprocal of the distance D1'). The second weighting W2' is proportional to an extent that the ground point CP12' is close to the second end L2 (for example, it is the reciprocal of the distance D2').

The location analysis unit 156 performs weighted calculations on the first contour position LC1' and the second contour position LC2' with the first weighting W1' and the second weighting W2' respectively to obtain the merged contour position LC12'.

In the example shown in FIG. 17, the ground point CP12' is close to the second end L2, so the second weighting W2' is larger; at this time, the ground point CP12' is far away from the first end L1, so the first weighting W1' is small. After performing the weighted calculation on the first contour position LC1' and the second contour position LC2', the merged contour position LC12' will be more biased towards the second contour position LC2'. The weighted calculation performed by the location analysis unit 156 is, for example, calculating the translation position of the first contour position LC1' and the translation position of the second contour position LC2' to obtain the translation position of the merged contour position LC12'. That is to say, the movement between the merged contour position LC12' and first contour position LC1' are greater than the movement between the merged contour position LC12' and the second contour position LC2'.

Figure 18:
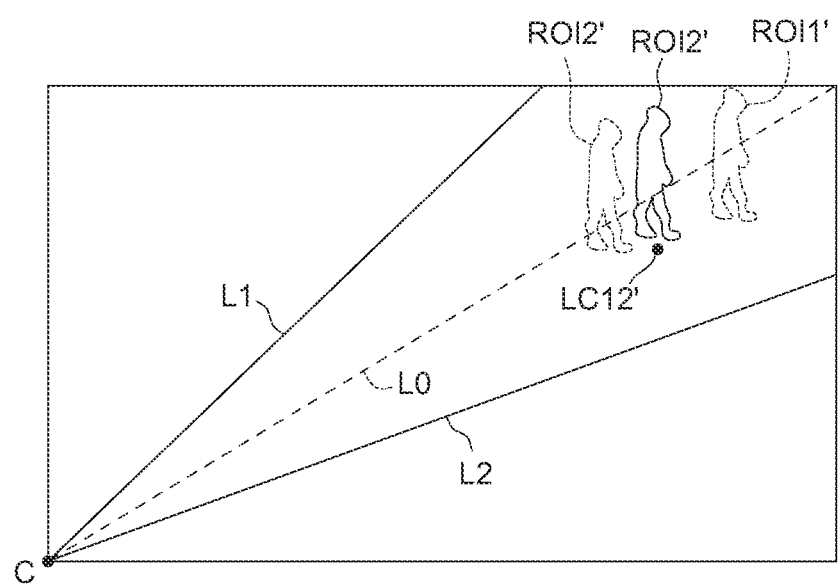
FIG. 18 shows an example of projecting the second interest object on the vehicle surround image according to the merged contour position.

Next, in step S170, as shown in FIG. 18, the image projection unit 157 projects the first interest object ROI1' or the second interest object ROI2' on the vehicle surround image IMC4' according to the merged contour position LC12' (shown in FIG. 5). FIG. 18 shows the example of projecting the second interest object ROI2' on the vehicle surround image IMC4' according to the merged contour position LC12'. In this step, if the ground point CP12' is located between the first end L1 and the central line L0, the image projection unit 157, for example, projects the first interest object ROI1' on the vehicle surround image IMC4'. If the ground point CP12' is located in the overlapping area RG12 and is located on the central line L0, the image projection unit 157 will project the first interest object ROI1' (or the second interest object ROI2') at the merged contour position LC12'. If the ground point CP12' is located between the central line L0 and the second end L2, the image projection unit 157, for example, projects the second interest object ROI2' on the vehicle surround image IMC4'.

As shown in FIG. 18, the ground point CP12' is located between the central line L0 and the second end L2, so the image projection unit 157 projects the second interest object ROI2' on the vehicle surround image IMC4'. In other words, when projecting, the image projection unit 157 will completely use the second interest object ROI2' (or the first interest object ROI1'), so that a complete shape can be seen without any partial disappearance, or multiple ghost images.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A processing method for vehicle surround view, comprising:
    obtaining a first exterior image and a second exterior image, wherein a first field-of-view for the first exterior image is different from a second field-of-view for the second exterior image;
    recognizing a first interest object in the first exterior image and a second interest object in the second exterior image, which correspond to an identical physical object;
    fitting the first interest object to a first geometric contour and fitting the second interest object to a second geometric contour;
    applying the first geometric contour and the second geometric contour on a 3D model, to obtain a ground point of the first geometric contour and the second geometric contour, a first contour position of the first geometric contour and a second contour position of the second geometric contour, wherein the ground point is a closest point between the first geometric contour and the second geometric contour to a center of the 3D model, the ground point is located on a bottom plane of the 3D model, an axis connecting the ground point to a corresponding point on an opposite side of the first geometric contour is the first contour position of the first geometric contour, and an axis connecting the ground point to a corresponding point on an opposite side of the second geometric contour is the second contour position of the second geometric contour;
    obtaining a merged contour position between the first contour position and the second contour position according to the ground point; and
    projecting the first interest object or the second interest object at the merged contour position on a vehicle surround image depending on a position of the ground point.

2. The processing method for vehicle surround view according to claim 1, wherein the first field-of-view and the second field-of-view are partially overlapped.

3. The processing method for vehicle surround view according to claim 1, wherein the first interest object and the second interest object are obtained through an artificial intelligence model.

4. The processing method for vehicle surround view according to claim 1, wherein the first geometric contour and the second geometric contour are ellipses, circles, polygons or object outlines.

5. The processing method for vehicle surround view according to claim 1, wherein the first field-of-view and the second field-of-view are overlapped with an overlapping area, the first contour position and the second contour position are weighted by a first weighting and a second weighting respectively to obtain the merged contour position, and the first weighting and the second weighting are related to a position of the ground point in the overlapping area.

6. The processing method for vehicle surround view according to claim 5, wherein the overlapping area has a central line, a first end and a second end, the first end is a boundary of the second field-of-view, the second end is a boundary of the first field-of-view, the first weighting is proportional to an extent that the ground point is close to the first end, the second weighting is proportional to an extent that the ground point is close to the second end.

7. The processing method for vehicle surround view according to claim 6, wherein
    if the ground point is located between the first end and the central line, the first interest object is projected on the vehicle surround image;
    if the ground point is located between the central line and the second end, the second interest object is projected on the vehicle surround image;

if the ground point is located on the central line, the first interest object or the second interest object is projected on the vehicle surround image.

8. The processing method for vehicle surround view according to claim 1, further comprising:
performing a projection-correction procedure on the first interest object and the second interest object.

9. The processing method for vehicle surround view according to claim 1, wherein the first contour position and the second contour position are rotation angles or translation positions.

10. A vehicle surround view system, comprising:
a first camera, used for obtaining a first exterior image, wherein the first camera has a first field-of-view;
a second camera, used for obtaining a second exterior image, wherein the second camera has a second field-of-view, and the first field-of-view is different from the second field-of-view; and
an in-vehicle processing device, comprising:
an object cropping unit, used for recognizing a first interest object in the first exterior image and a second interest object in the second exterior image, which correspond to an identical physical object;
a geometric profile fitting unit, used for fitting the first interest object to a first geometric contour and fitting the second interest object to a second geometric contour;
an applying unit, used for applying the first geometric contour and the second geometric contour on a 3D model, to obtain a ground point of the first geometric contour and the second geometric contour, a first contour position of the first geometric contour and a second contour position of the second geometric contour, wherein the ground point is a closest point between the first geometric contour and the second geometric contour to a center of the 3D model, the ground point is located on a bottom plane of the 3D model, an axis connecting the ground point to a corresponding point on an opposite side of the first geometric contour is the first contour position of the first geometric contour, and an axis connecting the ground point to a corresponding point on an opposite side of the second geometric contour is the second contour position of the second geometric contour;
a location analysis unit, used for obtaining a merged contour position between the first contour position and the second contour position according to the ground point; and
an image projection unit, used for projecting the first interest object or the second interest object at the merged contour position on a vehicle surround image depending on a position of the ground point.

11. The vehicle surround view system according to claim 10, wherein the first field-of-view and the second field-of-view are partially overlapped.

12. The vehicle surround view system according to claim 10, wherein the object cropping unit obtains the first interest object and the second interest object through an artificial intelligence model.

13. The vehicle surround view system according to claim 10, wherein the first geometric contour and the second geometric contour are ellipses, circles, polygons or object outlines.

14. The vehicle surround view system according to claim 10, wherein the first field-of-view and the second field-of-view are overlapped with an overlapping area, the location analysis unit uses a first weighting and a second weighting to weight the first contour position and the second contour position respectively to obtain the merged contour position, and the first weighting and the second weighting are related to a position of the ground point in the overlapping area.

15. The vehicle surround view system according to claim 14, wherein the overlapping area has a central line, a first end and a second end, the first end is a boundary of the second field-of-view, the second end is a boundary of the first field-of-view, the location analysis unit sets the first weighting to be proportional to an extent that the ground point is close to the first end, and the location analysis unit sets the second weighting to be proportional to an extent that the ground point is close to the second end.

16. The vehicle surround view system according to claim 15, wherein
if the ground point is located between the first end and the central line, the image projection unit projects the first interest object on the vehicle surround image;
if the ground point is located between the central line and the second end, the image projection unit projects the second interest object on the vehicle surround image;
if the ground point is located on the central line, the image projection unit projects the first interest object or the second interest object on the vehicle surround image.

17. The vehicle surround view system according to claim 10, wherein the in-vehicle processing device further comprises:
a projection-correction unit, used for performing a projection-correction procedure on the first interest object and the second interest object.

18. The vehicle surround view system according to claim 10, wherein the first contour position and the second contour position are rotation angles or translation positions.

19. An in-vehicle processing device, comprising:
an object cropping unit, used for recognizing a first interest object in a first exterior image and a second interest object in a second exterior image, wherein a first field-of-view for the first exterior image is different from a second field-of-view for the second exterior image, and the first interest object and the second interest object correspond to an identical physical object;
a geometric profile fitting unit, used for fitting the first interest object to a first geometric contour in the first exterior image and fitting the second interest object to a second geometric contour in the second exterior image;
an applying unit, used for applying the first geometric contour and the second geometric contour on a 3D model, to obtain a ground point of the first geometric contour and the second geometric contour, a first contour position of the first geometric contour and a second contour position of the second geometric contour, wherein the ground point is a closest point between the first geometric contour and the second geometric contour to a center of the 3D model, the ground point is located on a bottom plane of the 3D model, and the first contour position of the first geometric contour and the second contour position of the second geometric contour are obtained depending on a location of the ground point;
a location analysis unit, used for obtaining a merged contour position between the first contour position and the second contour position according to the ground point; and
an image projection unit, used for projecting the first interest object or the second interest object at the merged contour position on a vehicle surround image depending on a position of the ground point.

* * * * *